Figure 1:
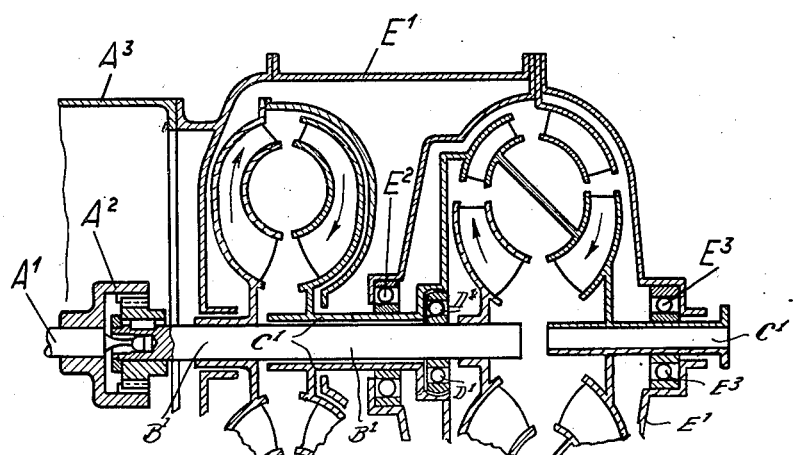

April 27, 1937. O. H. HACKER ET AL 2,078,759
HYDRODYNAMIC TURBO TRANSMISSION
Filed July 9, 1934

INVENTORS
OSKAR H. HACKER & ERNST SEIBOLD
BY C. P. Goepel.
ATTORNEY.

Patented Apr. 27, 1937

2,078,759

UNITED STATES PATENT OFFICE 2,078,759

HYDRODYNAMIC TURBO-TRANSMISSION

Oskar H. Hacker, Wiener-Neustadt, Austria, and Ernst Seibold, Heidenheim-on-the-Brenz, Germany, assignors to J. M. Voith, Heidenheim-on-the-Brenz, Germany, a copartnership composed of Walther Voith, Hermann Voith, and Hanns Voith Application July 9, 1934, Serial No. 734,439
In Germany July 10, 1933

3 Claims. (Cl. 60—54)

The invention relates to hydrodynamic turbo-transmissions, the rotary parts of which consist of a plurality of working liquid circuits and are enclosed in a stationary housing, this latter also serving as support for the rotary parts. Such a transmission may for instance be built in such a way that the primary shaft carries a pump impeller co-operating with a turbine runner on a hollow secondary shaft; said impeller and runner forming the first working liquid circuit. The second working liquid circuit consists of a pump impeller on the primary shaft, of two turbine runners arranged in series and fastened on the secondary shaft and of a fixed guide wheel interposed between said turbine runners and fastened to the housing.

The supporting of the rotary parts of such a transmission and the connection of the transmission to the prime mover, especially to an internal combustion engine have hitherto been very difficult, as on account of the unavoidable although slight inaccuracies in finishing the parts of the prime mover and the transmission an exact concentric position of the coupling elements is practically impossible.

The present invention affords a very simple and reliable means of supporting the rotating parts of the transmission and of coupling same with the prime mover.

In order to avoid the consequences of the already mentioned difficulties it has hitherto been necessary to interpose a flexible coupling between the motor and the shaft connected to it and to provide for at least two bearings for the latter.

According to this invention the flexible coupling may be omitted and the transmission shaft driven by the motor is coupled to the latter by means of an articulated joint permitting a slight angular difference in the alignment of both shafts. Such articulated joints may be of any known type, such as that used in a toothclaw spline shaft. Such joint takes up the radial load which in the usual design is taken up by a bearing and transmits it to the motor shaft and to the nearest motor bearing. The only bearing of the shaft driven from the motor and arranged within the transmission is preferably of the self-aligning type in order to adjust itself readily to the position of the shaft. The inaccuracy in the centering of the wheels on said shaft can be taken care of by sufficient ample clearances between these wheels and the adjacent parts. If a mechanical gear would be used instead of a turbo-transmission such simple means and the use of only one bearing would be impossible, as such gears call for an accurately centered position of the shaft, which latter, therefore, must be supported in at least two bearings.

Figure 2:
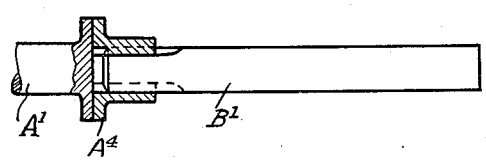

An embodiment of the invention is shown in Fig. 1, representing a longitudinal section through transmission and bearings; and in Fig. 2 is shown an alternative form of the coupling means.

The motor drives the primary shaft $B^1$ through a claw coupling, as follows: On the motor shaft $A^1$ a collar $A^2$ with inside claws is fixed; this collar engaging with a corresponding claw hub on primary shaft $B^1$. By such arrangement, it will be seen that said coupling consists of two engaging parts adapted to fit one within the other and to permit angular movement of the shafts $A^1$ and $B^1$. Fig. 2 shows a similar coupling $A^4$ where the claws are formed by suitable recesses in the shaft, i. e. by a so-called spline shaft. According to the invention the primary shaft $B^1$ is held by bearing $D^1$ in the hollow secondary shaft $C^1$; the latter being supported twice by bearings $E^2$ and $E^3$ in housing $E^1$. The bearing $D^1$ has its inner ring fixed to the primary shaft $B^1$. In order to be able to follow easily the angular deviation the primary shaft $B^1$ is supported only at one point in the hollow secondary shaft. The transmission is thus flanged on directly to the housing $A^3$ of the motor and forms with the latter one common unit, an advantage only made possible by the shaft coupling arrangement as conceived by the present invention.

Another difficulty in the arrangement of the bearings of turbo-transmissions resides in the axial thrust occurring in the primary and secondary shaft. According to this invention these thrusts are to be determined so that they are of the same magnitude but of opposite direction. In bearing $D^1$ of the primary shaft $B^1$ within the secondary shaft $C^1$ the oppositely directed thrusts of both shafts are balanced if hydraulic conditions allow of both thrusts being of the same magnitude. Should they differ from each other only the difference between both has to be transmitted to the housing.

The invention has the following advantages:

The axial thrust in the primary shaft is taken up by a bearing located in the secondary part, this bearing having a much smaller relative speed than a bearing arranged in the stationary housing. If for instance the primary shaft rotates at 2000 R. P. M. and is subject to an axial thrust of 1000 kgs. and if in normal operation the secondary shaft revolves at 1000 R. P. M. the thrust is taken up by a bearing with a relative speed of 1000 R. P. M., while a bearing in the stationary housing would have to sustain 2000 R. P. M.

If the axial thrusts in the driving and in the driven shaft are oppositely directed, they balance each other partly or fully and the bearing supporting the driven shaft in the housing must only take up a part of the axial load or none at all. If in the mentioned example the driven shaft is subject to an axial load of 1500 kgs. and if according to the invention the arrangement of the transmission is such that the thrusts are oppositely directed, the bearing of the driven shaft must only take up a load of 1500—1000=500 kgs.

We claim:

1. In a turbo-transmission having a plurality of working liquid circuits, a primary shaft, a pump impeller for each of said working liquid circuits arranged longitudinally on said primary shaft, a secondary shaft in alignment with the primary shaft and having a hollow part around the primary shaft, turbine runners for each of said working liquid circuits arranged longitudinally on said secondary shaft, a housing for said working liquid circuits and primary and secondary shafts, said housing supporting bearings for said secondary shaft, a guide wheel supported by said housing for certain of said turbine runners, and a single bearing interposed between the primary shaft and secondary shaft and disposed intermediate the two circuits for supporting the primary shaft near one end thereof, the combination therewith of a prime mover casing supporting said housing, a prime mover shaft therein, and a coupling on said prime mover shaft for the other end of the primary shaft having means permitting the angular difference between the alignment of the the prime mover shaft and primary shaft.

2. In a turbo-transmission having a plurality of working liquid circuits, a primary shaft, a pump impeller for each of said working liquid circuits arranged longitudinally on said primary shaft, a secondary shaft in alignment with the primary shaft and having a hollow part around the primary shaft, turbine runners for each of said working liquid circuits arranged longitudinally on said secondary shaft, a housing for said working liquid circuits and primary and secondary shafts, said housing supporting bearings for said secondary shaft, a guide wheel supported by said housing for certain of said turbine runners, and a single bearing interposed between the primary shaft and secondary shaft and disposed intermediate the two circuits for supporting the primary shaft near one end thereof, the combination therewith of a prime mover casing supporting said housing, a prime mover shaft therein, and a coupling consisting of two engaging parts, providing a clutch engagement between said prime mover and primary shafts which compensates for misalignment therebetween, and said coupling parts fitting freely into each other without additional means.

3. In a turbo-transmission having a plurality of working liquid circuits, a primary shaft, a pump impeller for each of said working liquid circuits arranged longitudinally on said primary shaft, a secondary shaft in alignment with the primary shaft and having a hollow part around the primary shaft, turbine runners for each of said working liquid circuits arranged longitudinally on said secondary shaft, a housing for said working liquid circuits and primary and secondary shaft, said housing supporting bearings for said secondary shaft, a guide wheel supported by said housing for certain of said turbine runners, a single bearing interposed between the primary shaft and secondary shaft and disposed intermediate the two circuits, for supporting the primary shaft near one end thereof, the combination therewith of a prime mover casing supporting said housing, a prime mover shaft therein, and a tooth and claw coupling on said prime mover shaft for the other end of the primary shaft, whereby the axial thrusts acting on the primary and secondary shafts are of substantially the same magnitude, in opposite directions and balance each other substantially fully in the bearing between the primary and secondary shafts.

OSKAR H. HACKER.
ERNST SEIBOLD.